(12) United States Patent
Peng et al.

(10) Patent No.: US 10,743,077 B2
(45) Date of Patent: Aug. 11, 2020

(54) POSITION-AWARE CORRECTIONS IN CONTENT ITEM SELECTION EVENTS

(71) Applicant: Microsoft Technology Licensing, LLC, Redmond, WA (US)

(72) Inventors: Lijun Peng, Mountain View, CA (US); David Pardoe, Mountain View, CA (US); Yuan Gao, Sunnyvale, CA (US); Jinyun Yan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 16/224,800

(22) Filed: Dec. 19, 2018

(65) Prior Publication Data
US 2020/0204868 A1 Jun. 25, 2020

(51) Int. Cl.
*H04N 21/482* (2011.01)
*H04N 21/45* (2011.01)
*H04N 21/431* (2011.01)

(52) U.S. Cl.
CPC ..... *H04N 21/4821* (2013.01); *H04N 21/4314* (2013.01); *H04N 21/4524* (2013.01)

(58) Field of Classification Search
CPC ........... H04N 21/4821; H04N 21/4524; H04N 21/4314; G06Q 30/0246; G06Q 30/0275
See application file for complete search history.

*Primary Examiner* — Yassin Alata
(74) *Attorney, Agent, or Firm* — Hickman Palermo Becker Bingham LLP; Daniel D. Ledesma

(57) ABSTRACT

Techniques for accounting for position-specific differences in user interaction while conducting content item selection events are provided. In one technique, a position-specific factor is determined. The position-specific factor may be based on a ratio of an observed interaction and a predicted interaction. Different positions in a content item feed or on a web page may be associated with different position-specific factors. Eventually, multiple content items are identified for presentation on a screen of a computing device. The content items include a first content item for which a predicted interaction rate is calculated and a second content item for which no predicted interaction rate is calculated. An order of the content items is determined based on the position-specific factor. For example, the predicted interaction rate of the first content item is modified based on the position-specific factor. The content items are presented on the screen based on the order.

20 Claims, 9 Drawing Sheets

POSITION-AWARE CORRECTIONS IN CONTENT ITEM SELECTION EVENTS

TECHNICAL FIELD

The present disclosure relates to electronic transmission of content items over a computer network and, more particularly, to accounting for position of content items during content item selection events.

BACKGROUND

The Internet has enabled the delivery of electronic content to billions of people. Some entities maintain content delivery exchanges that allow different content providers to reach a wide online audience. Different content providers have different goals in distributing their respective content items through the content delivery exchanges. A content delivery exchange allocates resources to each content provider. The manner in which the resources are consumed may be different depending on the goals. If resource allocation and consumption relative to different content items is not fair or accurate, then content items from some content providers may be treated unfairly by either consuming too many resources and or not being distributed through the content delivery exchange as frequently as is justifiable. Also, one possible approach to attempt to ensure fairness is too computationally expensive to perform in a selection process that should only take a few hundred milliseconds.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for efficiently and fairly sorting content items competing for multiple slots are provided. In one technique, a position-specific correction factor is determined for each of multiple slots in which a set of content items may be presented. The set of content items is sorted based on the position-specific correction factors. For example, for a first slot, a score is generated for each of multiple content items of different types, where one of the scores is based on a first position-specific correction factor. For a second slot, a score is generated for each of multiple content items of different types, where one of the scores is based on a second position-specific correction factor that is different than the first position-specific correction factor.

Embodiments improve content item selection events that are conducted in real-time. Specifically, embodiments allow a content item selection event to be performed faster with fewer computing resources required to conduct the content item selection event. Without some embodiments, a content item selection event might need to drop many candidate campaigns in order to perform the content item selection event in the time allotted. Also, typically, content item selection events involve a presumption that entity interaction with content items is constant regardless of where in a content item feed or a web page the content items are presented. A problem with this presumption is that entity interaction varies greatly with position and, thus, some types of content items are treated unfairly relative to other types. Embodiments assist in the fair treatment of content items in a content item selection event by considering differences in entity interactions rates for different content item positions.

System Overview

Figure 1:
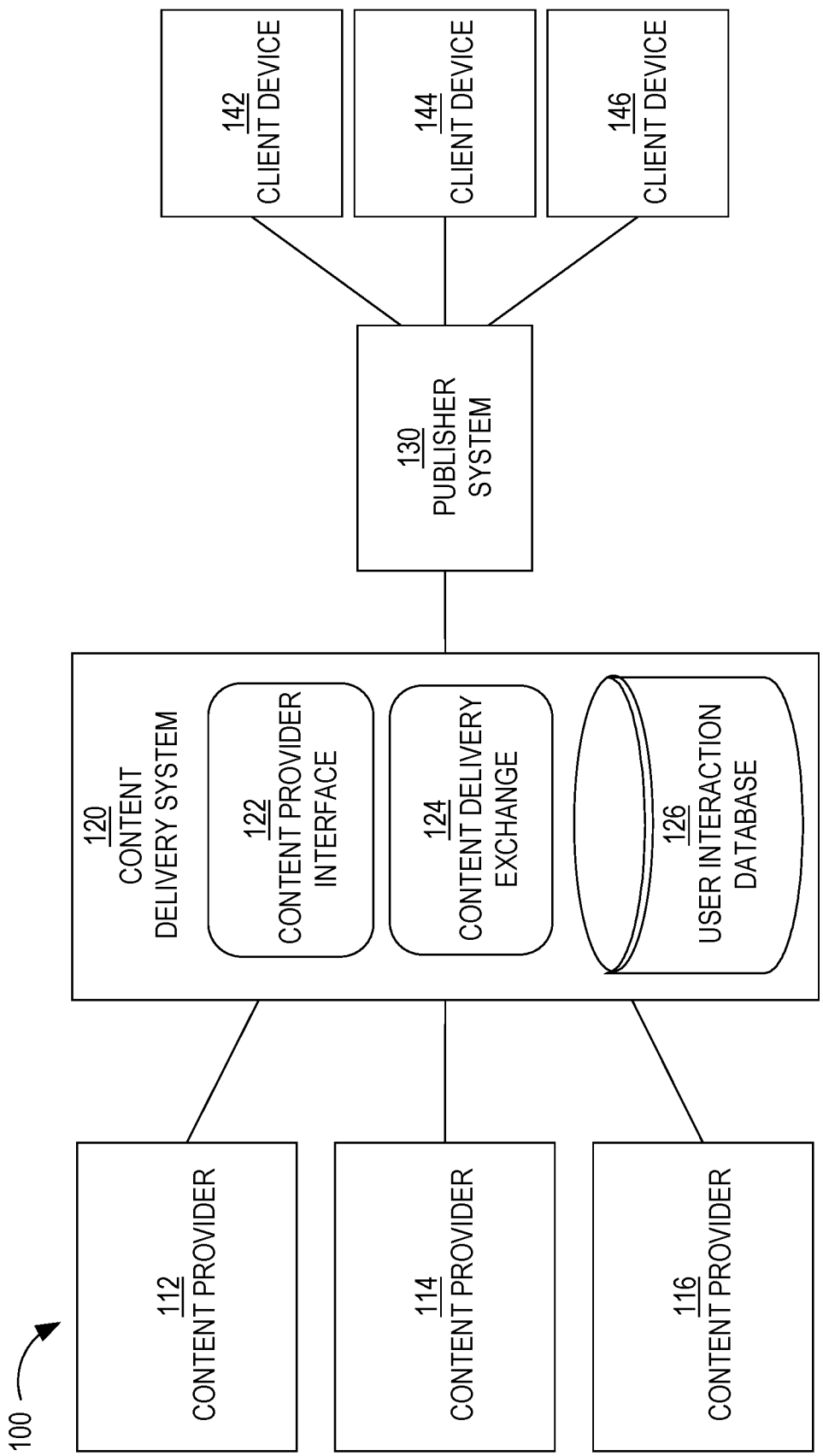
FIG. 1 is a block diagram that depicts an example system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns, (2) a content delivery exchange 124 that conducts content item selection events in response to content requests from a third-party content delivery exchange and/or from publisher systems, such as publisher system 130, and (3) user interaction database 126 that stores data about events that occurred relative to different content items.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Other possible charging models include charge per lead (CPL) (where a content provider is charged for each lead that results from a content item presented through content delivery system 120) and charge per view (CPV) (where a content provider is charged for each view of at least a portion of video that is part of a content item provided by the content provider). Content delivery system 120 may manage only campaigns that are of the same type of charging model or may manage campaigns that are of any combination of the three types of charging models.

A content delivery campaign may be associated with a resource budget that indicates a total or maximum the corresponding content provider is willing to be charged by content delivery system 120, such as $100 or $5,200. A content delivery campaign may also be associated with a bid amount that indicates how much the corresponding content provider is willing to be charged for each impression, click, view, lead, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted user selection (e.g., click-through) rate (which may be relevant only for CPC campaigns), a predicted view rate (which may be relevant only for CPV campaigns), a predicted lead rate (which may be relevant only for CPL campaigns), effective cost per impression (which may be relevant to CPC, CPM, CPL, CPV, and CPA, campaigns), and/or bid price. An effective cost per impression (ecpi) for a CPM campaign may be just the bid price for that CPM campaigns while an ecpi for a CPC campaign may be the bid price multiplied by the predicted user selection rate of that CPC campaign. An ecpi for a CPV campaign may be the bid price multiplied by the predicted view rate of that CPV campaign, while an ecpi for a CPL campaign may be the bid price multiplied by the predicted lead rate of that CPL campaign.

Each content delivery campaign may be associated with a bid price that represents how much the corresponding content provider is willing to pay (e.g., content delivery system 120) for having a content item of the campaign presented to an end-user or selected by an end-user. The amount charged to a content provider for delivering a content item or for a user selecting the content item depends on the type of content item selection event. Examples of content item selection events include first price events and second price events. A first price content item selection event is where the winning bidder pays the amount the bidder bids, while a second price content item selection event is where the winning bidder pays the amount of the next highest bidder.

Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, etc.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

In an embodiment, a content item selection event is considered a "mixed" event. A mixed content item selection event is one where content items (or content delivery campaigns) associated with different charging types are identified as candidate content items. For example, at least one of the candidate content delivery campaign of a content item selection event is a CPC campaign while at least one other content delivery campaign is a CPM campaign.

Event Logging

Content delivery system 120 may log, in user interaction database 126, one or more types of events, with respect to content item, across client devices 152-156 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item, content delivery system 120 may calculate a user selection rate (e.g., CTR) for the content item.

Based on user interaction data, a user selection rate may be calculated for a particular content item, for a content delivery campaign that comprises multiple content items, for a set of multiple content delivery campaigns, for a content provider that initiates multiple content delivery campaigns, for a particular user, and for a particular group of users (e.g., all users with a college degree that live in Texas). A (e.g., observed) user selection rate may be defined as a ratio of a number of clicks to a number of impressions. For example, a user selection rate of a content item is the number of times the content item was selected (e.g., clicked) (e.g., regardless of who selected) divided by a number of items the content item was presented to users. As another example, a user selection rate of a content delivery campaign is the number of times users selected any content item of the content delivery campaign divided by the number of times any content item of the content delivery campaign was presented to users.

Position Bias

In one approach to ranking content items in a content item selection event, a predicted entity (or user) selection rate is determined for each of one or more content items. The predicted user selection rate may be calculated using a prediction model, whether machine-learned or a set of manually established rules. Whichever technique is used to determine a predicted user selection rate of a content item, the technique may be position-aware, which means the technique presumes each content item will be presented at a particular position, such as the top-most slot in a content item feed for content items of a particular type. However, content items from a content item selection event cannot all fit in the same slot. A content item feed or a web page may contain multiple slots in which content items from one or more content item selection event may be inserted. Also, analysis of actual user behavior with respect to content items reveals that position matters. For example, the higher the position that a content item appears in a content item feed, all else being equal, the more likely that the content item will be selected (e.g., clicked or viewed) by a user. Conversely, the further down a content item feed a user scrolls, the less likely the user will select a content item.

If all candidate content items in a content item selection event are of the same charging type, then position does not matter because each of the candidate content items will be treated equally regardless of which slot is available. However, if a content item selection event is a mixed event, then position does matter. For example, content items from CPM campaigns do not have predicted user selection rates while content items from CPC campaigns do and content items from CPV campaigns have predicted view rates. Because prediction models for CPC, CPV, CPL, and CPA campaigns are position-aware or assume that all content items are presented in the top, first or main position of a content item feed or web page, there is "position bias" for content items from CPC, CPV, CPL, and CPA campaigns that are not selected for the top position. In other words, a first content item from a CPC campaign may be selected before a second content item from a CPM campaign as a result of an artificially inflated predicted user selection rate of the first content item.

If content delivery system 120 includes a prediction model that is position-aware, then either (a) position information still might be unavailable at prediction time or (b) leveraging position information might be infeasible. For example, a content item selection event involves one hundred candidate content delivery campaigns (and their respective content items). Seventy of those candidate campaigns are CPC campaigns. Thus, for a first position in a content item feed, a prediction model is invoked seventy times, once for each candidate CPC campaign. A score is generated for each of the one hundred candidate campaigns and the score for each of the seventy CPC campaigns is based on one of the corresponding predicted user selection rates. If a CPC campaign is selected for the first position, then, for a second position in the content item feed, the prediction model is invoked sixty-nine times, once for each remaining CPC campaign. The process for invoking the prediction model repeats until there are no more available slots in the content item feed or there are no more CPC campaigns. Thus, the prediction model will be invoked potentially hundreds or thousands of times for each content item selection event, which is infeasible in a real-time scenario where a content item selection event must be completed in a short period of time, such as one hundred milliseconds.

In addition to giving an undeserved boost for CPC (and CPV, CPL, CPA) campaigns over CPM campaigns, charging content providers is affected in the following cases where a second price content item selection event model is implemented:

a. CPC campaign A supported by CPM campaign B. A click is priced as $\max(eCPI_B/pCTR_A, \text{floor}_{A,CPC})$ and thus likely to be undercharged. Re-calibrating pCTR for lower positions corrects undeserved revenue losses.

b. CPM campaign A supported by CPC campaign B. An impression is priced as $\max(eCPI_B, \text{floor}_{A,CPM}/1000)$ and thus likely to be overcharged. Re-calibrating pCTR for lower positions corrects undeserved revenue gains.

c. Auto-bidding campaign A supported by CPC campaign B or floor price. Auto-bidding campaigns bid by clicks while being charged by impressions. An impression is priced as $\max(eCPI_B, \text{floor}_{A,CPC}*pCTR_A)$ and thus overcharged. Auto-bidding campaigns deliver fewer clicks than expected but still pay for all the impressions.

In some content delivery systems, there is no way of knowing a slot position at the time of the content item selection event. For example, one engineering team develops and maintains a content item matching system while another engineering team develops and maintains a feed engine, which takes, as input, content items from the content item matching system, which content items might be only a small subset of all content items that are presented in a content item feed. For example, for one content item feed, the feed engine might place content items from the content item matching system at positions 2, 8, 14, and so forth while for another content item feed, the feed engine might place content items from the content item matching system at positions 2, 9, 16, and so forth.

Position-Specific Factor Correction

In an embodiment, a position-specific factor is applied to a score of a candidate content item in order to generate an updated score, which is used to sort or rank the candidate content item relative to other candidate content items. Advantages of utilizing a position-specific factor correction over repeating invoking a position-aware prediction model include the fact that a position-specific factor correction (1) being independent of the content item matching system, (2) being low scoring cost in terms of time and processing power, and (3) honoring decreasing eCPI.

For the first or main slot in a web page or content item feed, the content item selection event would proceed the same as the current system. For example, a score (e.g., an eCPI) is computed for each candidate content item and the candidate content items are ranked by their respective scores.

For the next slot in the web page or content item feed and beyond, a score for each of multiple candidate content delivery campaign is re-computed. For example, a score for each non-CPM campaign is re-computed based on a position-specific factor and, subsequently, the non-CPM campaigns are ranked by their respective scores. Thus, the score for CPM campaigns computed initially can be reused and does not need to be re-computed. The content provider of the winning content item (of a content item selection event) pays the runner up's eCPI.

Position-Specific Factors

A position-specific factor may be pre-defined manually or automatically. For example, a user/administrator of content delivery system 120 may define a position-specific factor for each content item position or slot position. A "content item position" is a position that is relative to other content items that are selected as a result of a content item selection event. Even though a first content item may have the first content item position and a second content item may have the second content item position, other types of content items may be presented before and after the first content item and/or second content item. A "slot position" is an actual position in which a content item of any type may be presented, some of which may not be the result of a content item selection event and/or may originate from a system that is entirely different than content delivery system 120. For example, content items C1-C3 from a content item selection event have the following content item positions, respectively, {1, 2, 3}. However, in a content item feed, feed items F1-F5 and content items C1-C3 are ordered as follows: {F1, C1, F2, F3, C2, F4, F5, C3}. Thus, the slot positions of C1-C3 are, respectively, {2, 5, 8}.

A single position-specific factor may be used for all content item positions or all slot positions after the first position. Alternatively, a different position-specific factor may be determined for each position. For example, a first position-specific factor is used for the second content item position, a second position-specific factor is used for the third content item position, a third position-specific factor is used for the fourth content item position, and so forth.

Instead of manually defining one or more position-specific factors, one or more position-specific factors are determined automatically. For example, a first value is computed for a first content item position and a second value is computed for a second content item position. A ratio of the second value to the first value is then used as a position-specific factor for the second content item position. A third value is computed for a third content item position. A ratio of the third value to the third value is then used as a position-specific factor for the third content item position; and so forth. Thus, for the third content item position and later positions, the value for that position is relative to the first content item position (and is based on the value of that first content item position).

Examples of a value that may be computed for a content item position may be an actual or observed number of user selections that have occurred at that content item position across multiple content item feeds (presented to multiple different users) over a period of time (e.g., the last week), a ratio of (1) a number of actual user selections that have occurred at that content item position to (2) a number of predicted user selections at that content item position, and a ratio of (1) an actual user selection rate at that content item position to (2) a predicted user selection rate at that content item position.

For example, a first observed user selection rate for the first content item position is divided by a first predicted user selection rate for the first content item position to generate a first ratio. A second observed user selection rate for the second content item position is divided by a second predicted user selection rate for the second content item position to generate a second ratio. Then, a ratio of the second ratio to the first ratio is generated and becomes a position-specific factor for the second content item position.

Different Position-Specific Factors for Different Types of Campaigns

The above values are based on user selections and thus correspond to CPC campaigns.

In an embodiment, different sets of position-specific factors are generated and used for different types of content delivery campaigns. For example, a first set of position-specific factors are generated for CPC campaigns, a second set of position-specific factors are generated for CPV campaigns, and a third set of position-specific factors are generated for CPL campaigns.

Thus, for CPV campaigns, example values that may be computed for each of one or more content item positions include an actual/observed number of user views that have occurred at that content item position across multiple content item feeds (presented to multiple different users) over a period of time (e.g., the last week), a ratio of (1) a number of actual user views that have occurred at that content item position to (2) a number of predicted user views at that content item position, and a ratio of (1) an actual user view rate at that content item position to (2) a predicted user view rate at that content item position.

Similar values may be computed for content items of other charging types, such as CPL and CPA campaigns. For example, for CPL campaigns, values are based on a number of actual leads and, optionally, number of predicted leads.

Example Process

Figure 2:
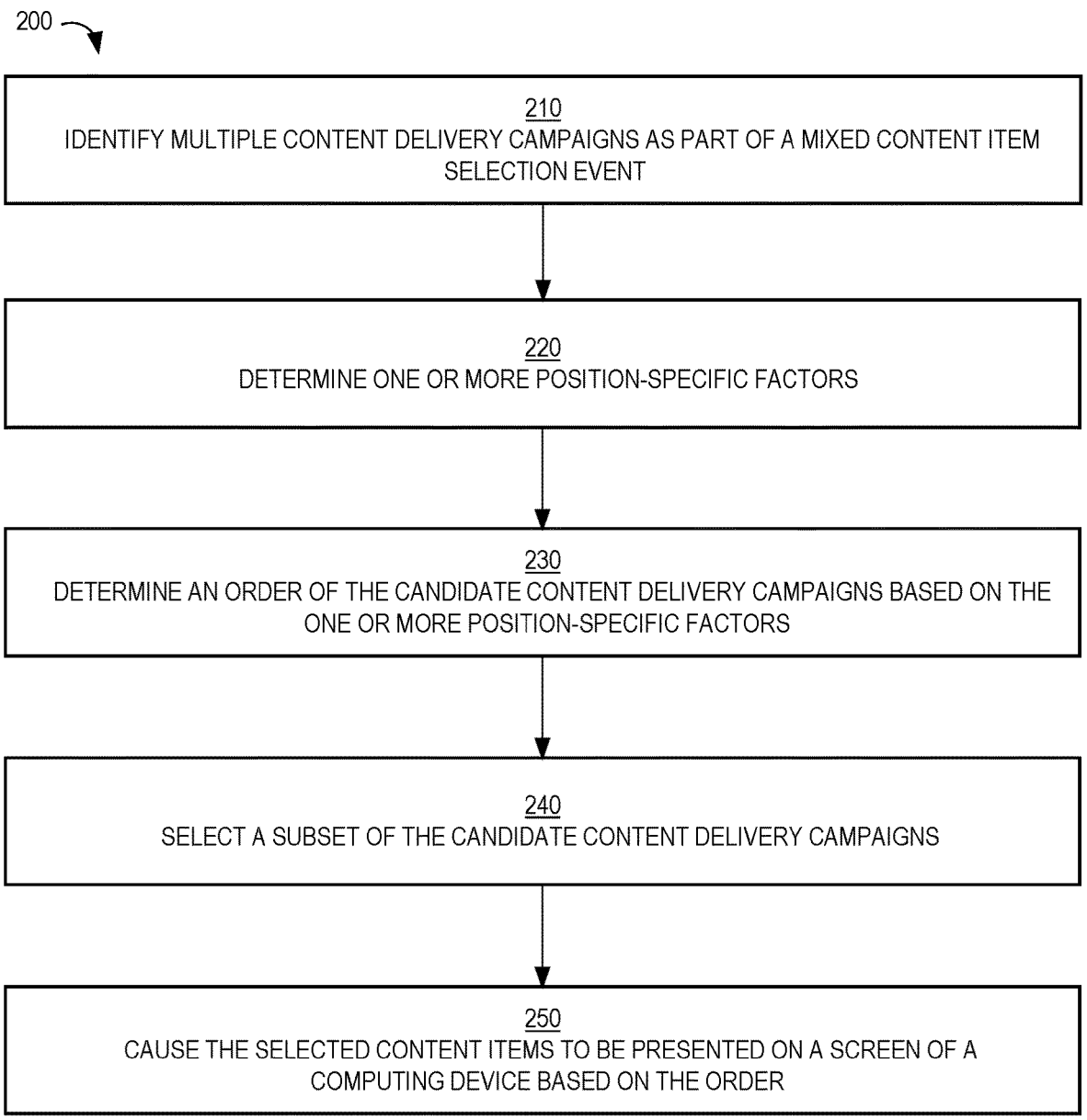
FIG. 2 is a flow diagram that depicts an example process for performing a content item selection event based on position-specific factors, in an embodiment.

FIG. 2 is a flow diagram that depicts an example process 200 for performing a content item selection event based on position-specific factors, in an embodiment. Process 200 may be implemented by content delivery system 120.

At block 210, multiple candidate content delivery campaigns are identified as part of a mixed content item selection event. Thus, the candidate content delivery campaigns include one or more content delivery campaigns of different charging types. For example, the candidate content delivery campaigns include one or more CPC campaigns and one or more CPM campaigns. As another example, the candidate content delivery campaigns include one or more CPC campaigns and one or more CPV campaigns.

The content item selection event may be triggered by receiving a content request from a client device (e.g., client device 142).

At block 220, one or more position-specific factors are determined. Block 220 may be performed before or after block 210. A single position-specific factor may be determined for multiple available slots and/or a different position-specific factor may be determined for each available slot. A position-specific factor may be established manually or automatically based on user interaction data relative to different slots.

At block 230, an order of the candidate content delivery campaigns is determined based on the one or more position-specific factors. Block 230 may involve using a single position-specific factor for the second and subsequent content item positions or using a different position-specific factor for each content item position after the first content item position. There may be a content item position after which there is no position-specific factor. In that case, the most recent position-specific factor may be used.

Block 230 may also involve first determining a score for each candidate content delivery campaign, such as an eCPI. For each CPM campaign, score may be determined by retrieving, from storage, a bid of the CPM campaign. The bid may be established by the content provider of the CPM campaign or automatically by content delivery system 120, which bid value may change from time to time depending on current available budget, projected spend, time of day, etc.

At block 240, a subset of the candidate content delivery campaigns is selected. The number of candidate content delivery campaigns that are selected may be based on a pre-defined value. For example, the top twenty candidate content delivery campaigns are selected in each content item selection event.

At block 250, content items from the subset of the candidate content delivery campaigns are caused to be presented in the determined order on the screen of the client device. Block 240 may involve content delivery system 120 sending the selected content items to publisher system 130, which transmits the selected content items to the client device. Alternatively, publisher system 130 transmits content item identifiers (e.g., URLs) in a particular order to the client device and the client device processes the content item identifiers to retrieve the corresponding content items from a remote source, such as a content delivery network (CDN).

Queue Merge

One approach to implement block 230 is, at each content item position after the first content item position, to re-compute a score for each candidate non-CPM campaign, apply the appropriate position-specific factor to that score to generate an updated score, and then sort based on the updated scores. However, this approach requires re-computing a score unnecessarily for many non-CPM campaigns.

Figure 3:
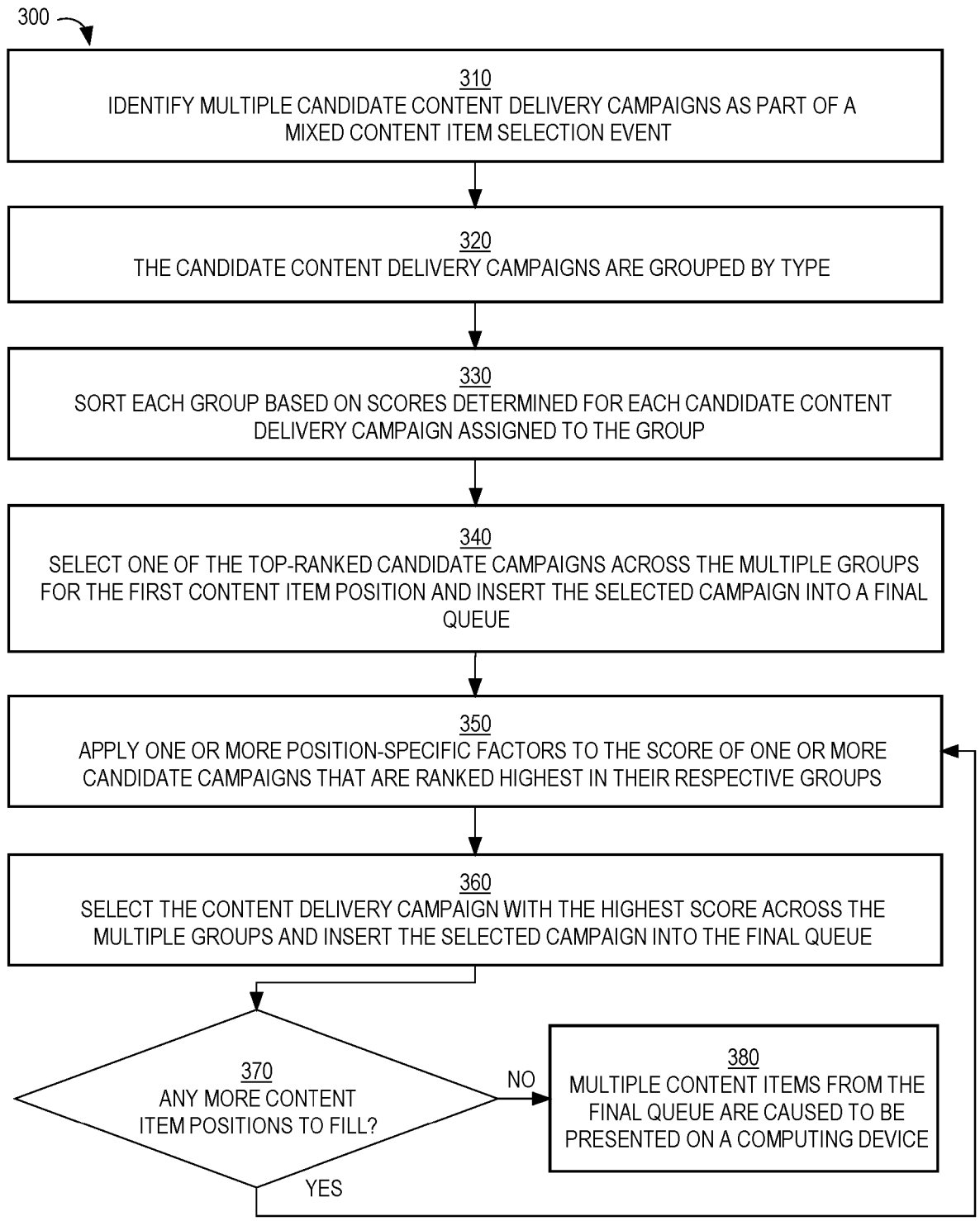
FIG. 3 is a flow diagram that depicts an example process 300 for performing a content item selection event based on position-specific factors, in an embodiment.

FIG. 3 is a flow diagram that depicts an example process 300 for performing a content item selection event based on position-specific factors, in an embodiment. Process 300 may be implemented at least partially by content delivery system 120.

At block 310, multiple candidate content delivery campaigns are identified as part of a mixed content item selection event. Thus, the candidate content delivery campaigns include content delivery campaigns of different charging types. For example, the candidate content delivery campaigns include one or more CPC campaigns and one or more CPM campaigns. The content item selection event may be triggered by receiving a content request from a client device (e.g., client device 142).

At block 320, the candidate content delivery campaigns are grouped by (charging) type. For example, CPM campaigns are grouped separately from non-CPM campaigns. As another example, CPM campaigns are assigned to a first group, CPC campaigns are assigned to a second group, and CPV campaigns are assigned to a third group. Each group may be considered a queue or list of content delivery campaigns.

At block 330, each group is sorted separately based on scores of the respective content delivery campaigns assigned to each group. For example, a score is generated for each content delivery campaign in each group. The score of a content delivery campaign may be eCPI. For a CPM campaign, its eCPI is the bid of the CPM campaign. For CPC campaigns, its eCPI is the bid of the CPC campaign multiplied by the predicted user selection rate of the CPC campaign. For CPV campaigns, its eCPI is the bid of the CPV campaign multiplied by the predicted view rate of the CPV campaign. Once the scores are generated, the scores of the content delivery campaigns in each group are used to order or rank the content delivery campaigns in that group.

At block 340, one of the top-ranked content delivery campaigns across the multiple groups is selected for the first content item position and inserted in a "final queue." For example, the scores of the top ranked campaign in each group are considered and compared to each other. Thus, if there are two groups, then only two scores are considered. If there are three groups, then only three scores are considered. Block 340 concludes by removing the selected content delivery campaign from the corresponding group. The other groups remain untouched and all groups remain sorted.

"Inserting" a selected content delivery campaign into the final queue may involve adding, to the final queue, a reference to the campaign (e.g., a campaign ID) or to a corresponding content item (e.g., content item ID).

At block 350, one or more position-specific factors are applied to one or more non-CPM campaigns that are ranked highest in their respective groups. For example, if there are two groups, then a position-specific factor is multiplied by a score of the top-ranked content delivery campaign in one of the groups (e.g., for CPC or CPV campaigns). If there are three groups (e.g., CPC, CPV, and CPM groups), then a first position-specific factor is multiplied by a score of the top-ranked CPC campaign and a second position-specific factor is multiplied by a score of the top-ranked CPV campaign. Thus, not all top-ranked content delivery campaigns will be affected by the same position-specific factor. For example, if there is a group for CPM campaigns, then no position-specific factor will be applied to any of the CPM campaigns.

A result of block 350 is a recomputed score (that is based on a position-specific factor) for at least the highest ranked campaign in one of the groups. In some situations, two or more scores are re-computed in block 350, where the two or more recomputed scores are from different groups.

At block 360, the campaign with the highest score after block 350 is selected for the next content item position and inserted into the final queue. Block 360 concludes by removing the selected content delivery campaign from the corresponding group. The other groups remain untouched and all groups remain sorted.

Blocks 340-360 may be considered a merging of the separate queues in order to generate a single final sorted list or queue. Each iteration of blocks 340-360 is another step in the merging of the separate queues.

At block 370, it is determined whether there are any more content item positions to fill. Initially, there may be a pre-defined number of content item positions to fill, such as twenty. If the determination in block 370 is positive, then process 300 returns to block 350. Otherwise, process 300 proceeds to block 380. Block 370 may involve determining a number of available entries in the final queue. For example, the final queue may be a pre-determined size, such as twenty entries. Thus, once the final queue includes twenty references to twenty different content delivery campaigns or their corresponding content items, then process 300 proceeds to block 380.

At block 380, multiple content items from the ordered content delivery campaigns are caused to be presented, on the screen of the client device, in the order in which they were selected. Block 380 may involve sending the ordered content delivery campaigns (or their respective content items, or their respective identifiers) to a display (e.g., feed) engine that determines what to display on a web page or a content item feed and takes into account the ordered campaigns/content items as well as content items from other sources and/or of other types. For example, another source may provide content items describing activity (e.g., likes, shares, comments, posts) of registered users, of a social network, who are connections of a particular user to whom a content item feed will be presented.

FIGS. 4A-4E are block diagrams that depict three example queues 410-440 at different stages in a content item ordering process, in an embodiment. Queue 410 corresponds to CPM campaigns and contains content items 412-418, queue 420 corresponds to CPC campaigns and contains content items 422-428, queue 430 corresponds to CPV campaigns and contains content items 432-436, and queue 440 corresponds to the "final queue" that is initially empty (in FIG. 4A) because no content items have been selected yet from any of the other queues. Each of queues 410-440 is ordered based on eCPI. For the CPC campaigns, each eCPI is based on a predicted user selection rate of the corresponding CPC campaign. For the CPV campaigns, each eCPI is based on a predicted user view rate of the corresponding CPV campaign.

Figure 4A:
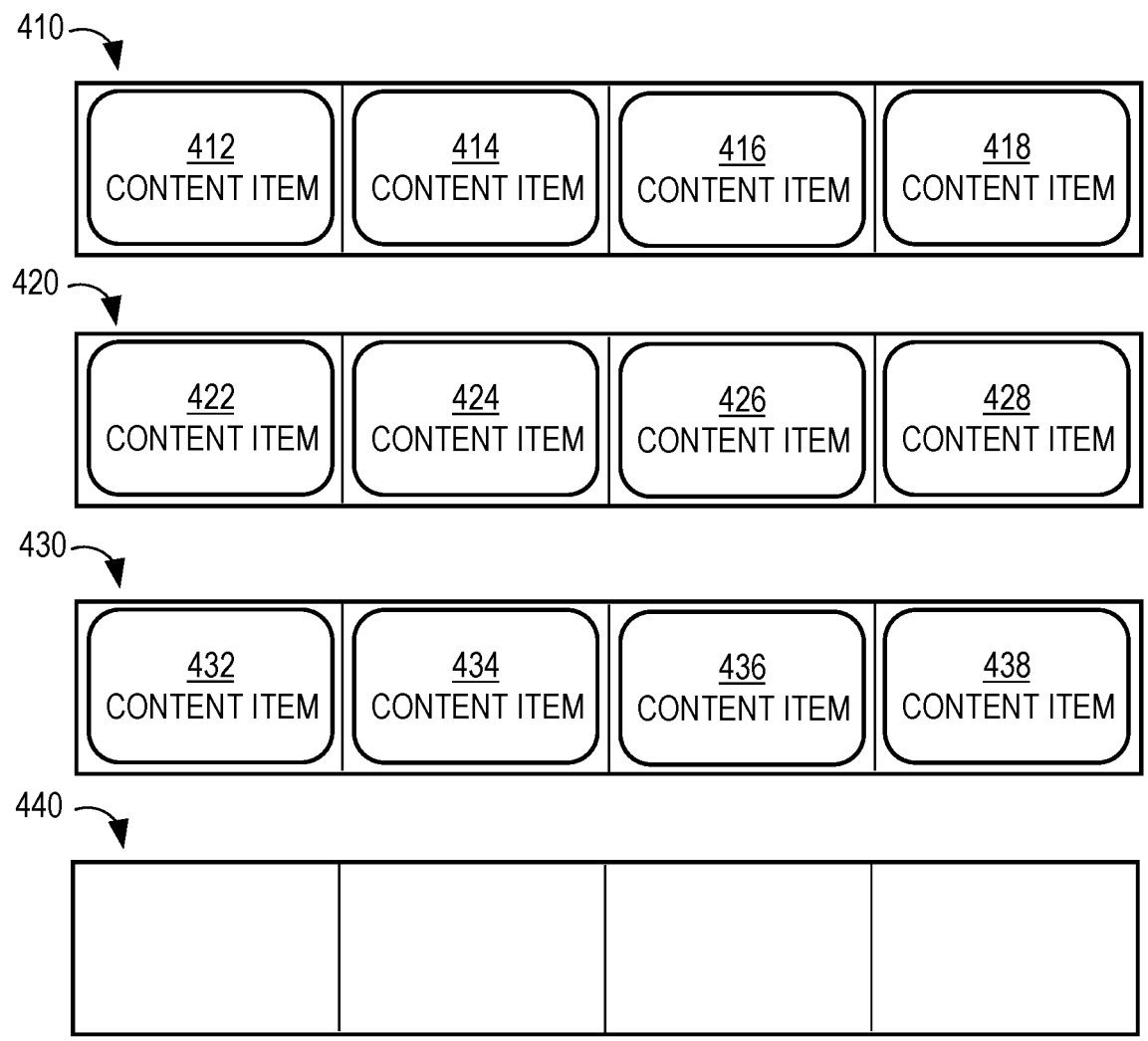
FIGS. 4A-4E are block diagrams that depict three example queues at different stages in a content item selection event, in an embodiment.
Figure 4B:
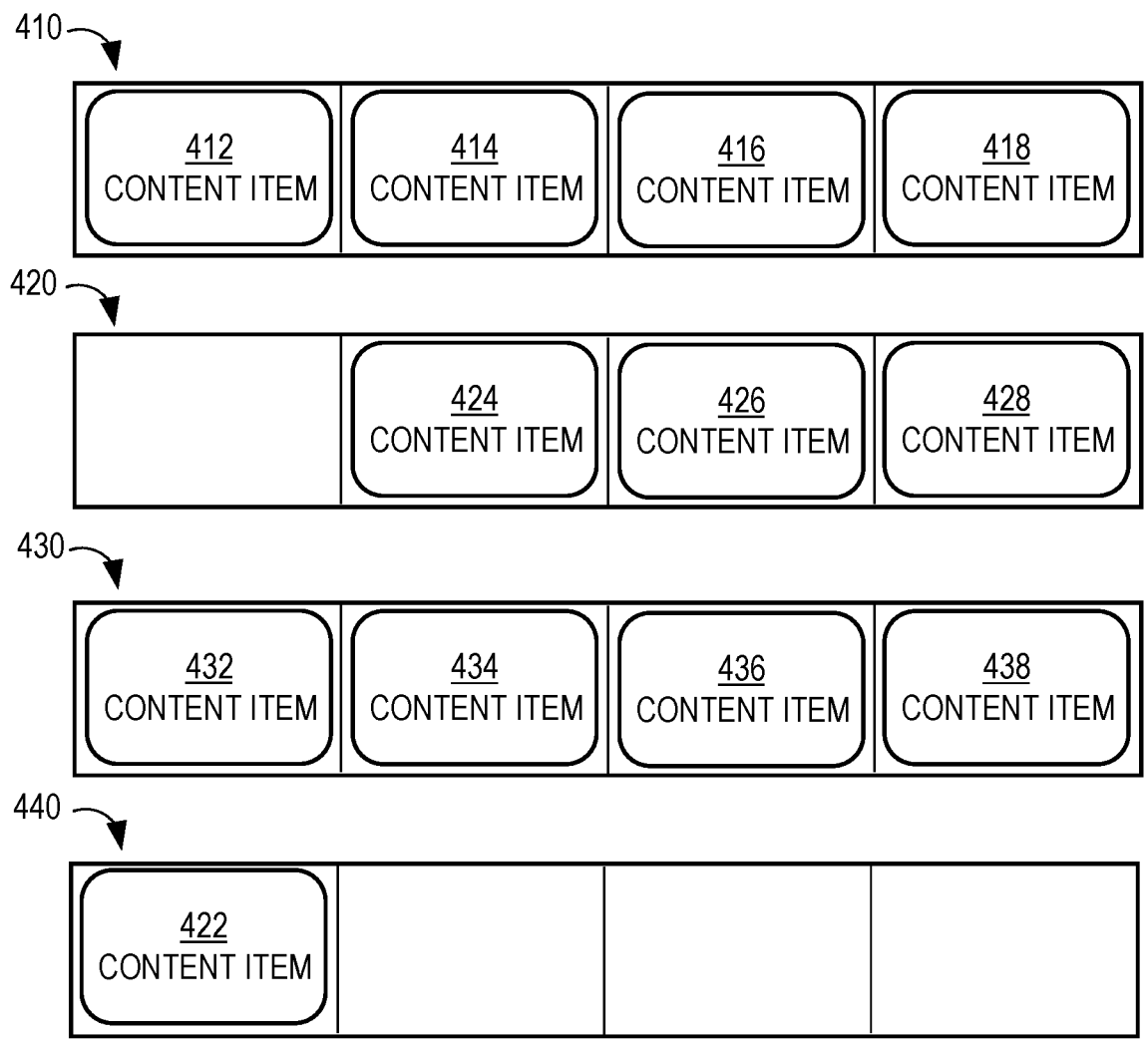

FIG. 4B corresponds to block 340. Because block 340 involves selecting a content item for the first content item position, no position-specific factors are used. In this example, because content item 422 has the highest eCPI among content items 412, 422, and 432, content item 422 is selected for the first content item position in queue 440 and is removed from queue 420.

Figure 4C:
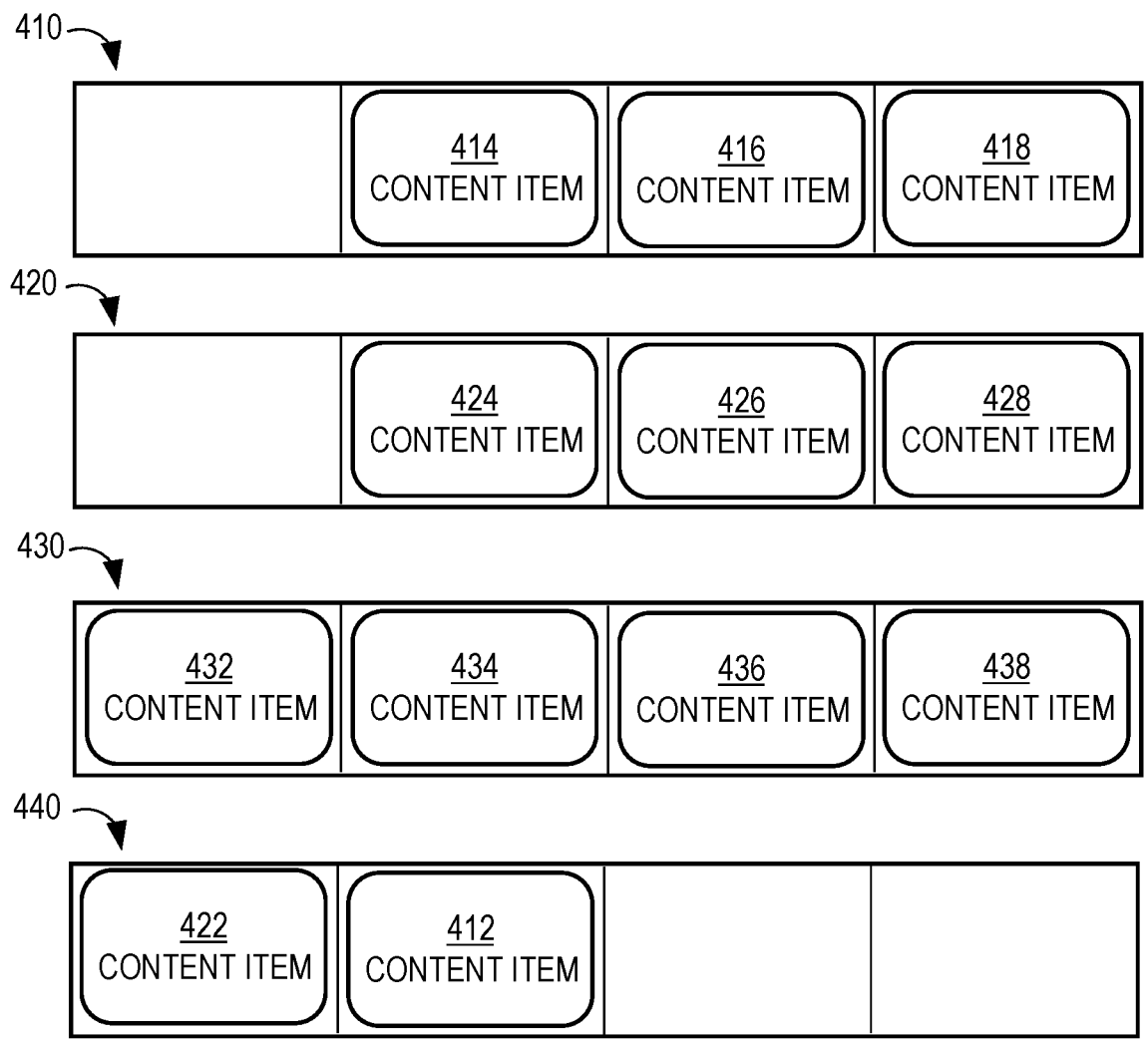

FIG. 4C corresponds to a first iteration of block 350. For the second content item position, a first position-specific factor for CPC campaigns is determined and a second position-specific factor for CPV campaigns is determined. The first position-specific factor is applied to the eCPI of content item 424 and the second position-specific factor is applied to the eCPI of content item 432. In this example, because content item 412 has the highest eCPI among content items 412, 424, and 432, content item 412 is selected for the second content item position in queue 440 and is removed from queue 410.

Figure 4D:
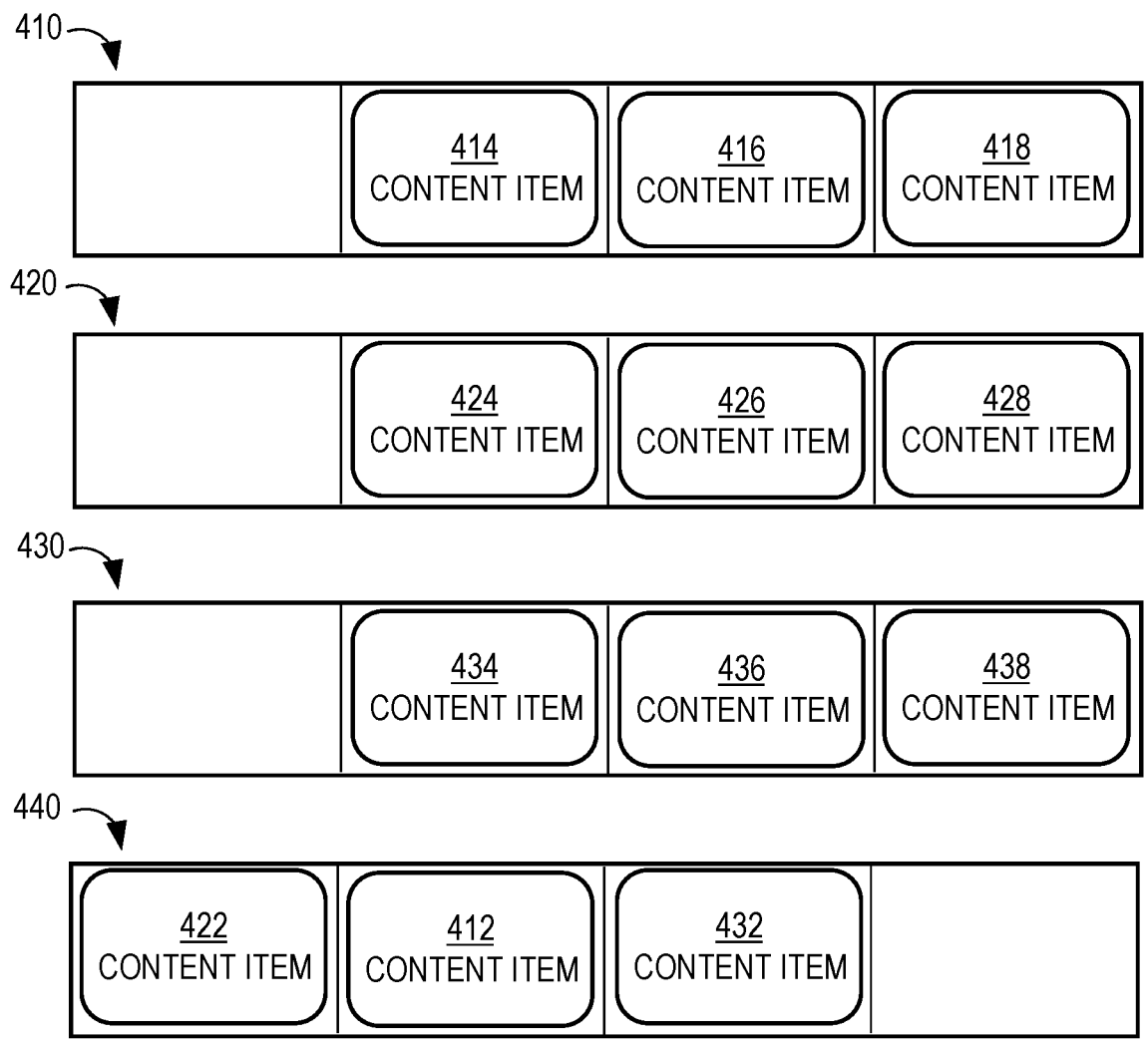

FIG. 4D corresponds to a second iteration of block 350. For the third content item position, a third position-specific factor for CPC campaigns is determined and a fourth position-specific factor for CPV campaigns is determined. The third position-specific factor is applied to the eCPI of content item 424 and the fourth position-specific factor is applied to the eCPI of content item 432. In this example, because content item 432 has the highest eCPI among content items 414, 424, and 432, content item 432 is selected for the third content item position in queue 440 and is removed from queue 430.

Figure 4E:
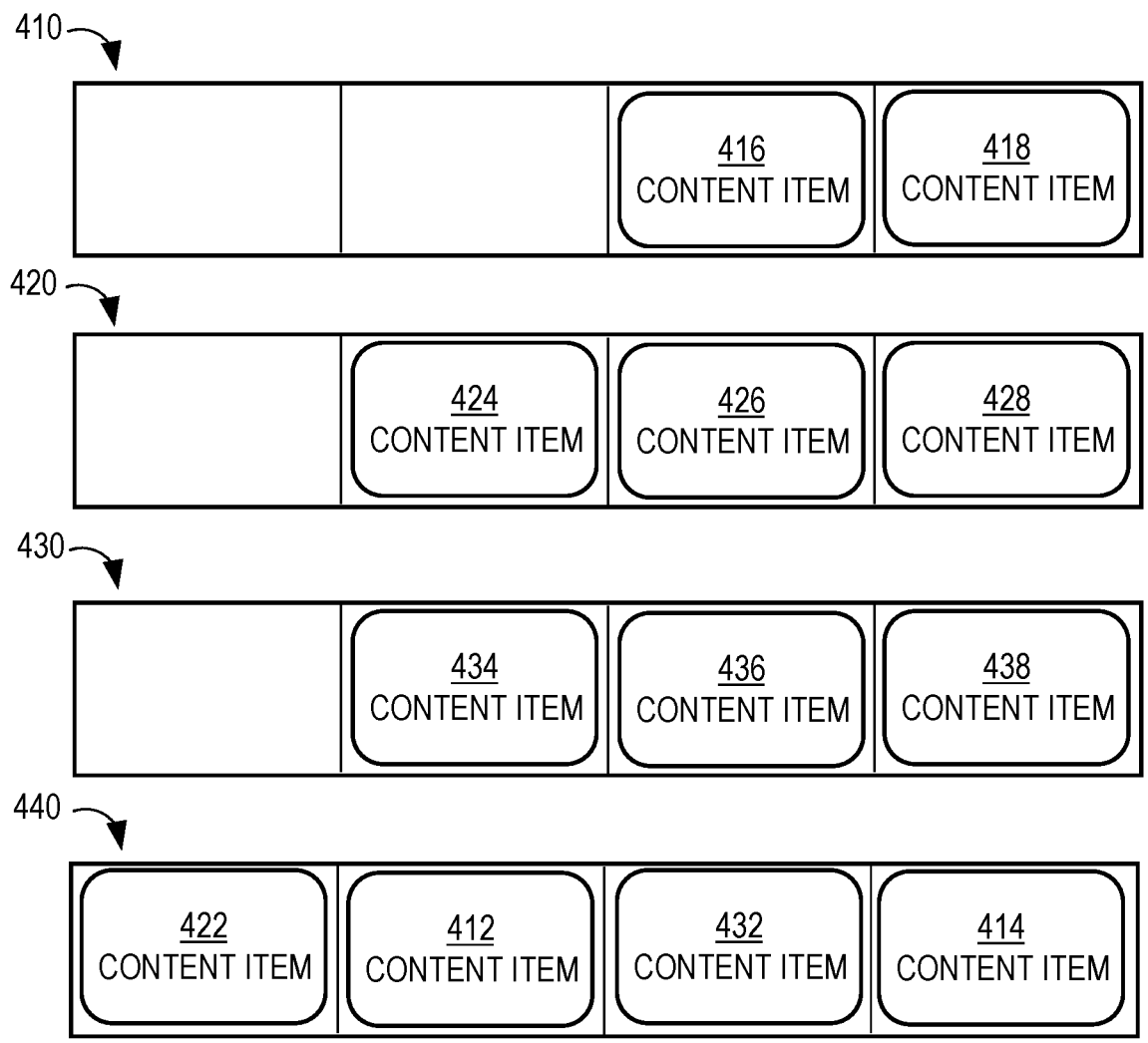

FIG. 4E corresponds to a third iteration of block 350. For the fourth content item position, a fifth position-specific factor for CPC campaigns is determined and a sixth position-specific factor for CPV campaigns is determined. The fifth position-specific factor is applied to the eCPI of content item 424 and the sixth position-specific factor is applied to the eCPI of content item 434. In this example, because content item 414 has the highest eCPI among content items 414, 424, and 434, content item 414 is selected for the fourth content item position in queue 440 and is removed from queue 410.

Updating Position-Specific Factors

In an embodiment, one or more position-specific factors are automatically updated. For example, a position-specific factor for day 8 is based on (1) observed user selections for days 1-7 at different content item positions and (2) predicted user selections for days 1-7 at those same content item positions. Position-specific factors may be updated weekly, daily, or more or less frequently.

Position-Specific Factors for Different Dimensions

In an embodiment, position-specific factors are generated for different dimensions. Example dimensions include time window, channel, device, and geography. For example, a first set of position-specific factors is generated for a first channel (e.g., mobile), a second set of position-specific factors is generated for a second channel (e.g., desktop), and a third set of position-specific factors is generated for a third channel (e.g., tablet). Within each of those sets of position-specific factors, there may be different subsets of position-specific factors for different types of non-CPM campaigns.

As another example, a first set of position-specific factors is generated for weekdays (e.g., based on data from the past twenty-two weekdays) and a second set of position-specific factors is generated for weekends (e.g., based on data on the past four weekends). As another example, a first set of position-specific factors is generated for a first device (e.g., iOS devices) and a second set of position-specific factors is generated for a second device (e.g., Android devices). As another example, a first set of position-specific factors is generated for a first geographical region (e.g., North America) and a second set of position-specific factors is generated for a second geographic region (e.g., China).

In a related embodiment, a position-specific factor is generated for a combination of two or more dimensions.

Position-Specific Factors for Charging

In an embodiment, in addition to ordering candidate content items based on position-specific factors, such factors are used to charge content providers for presenting those candidate content items. A second campaign is said to "support" a first campaign if the first campaign is ranked one content item position above the content item position of the second campaign. There are three main types of scenarios in which position-specific factors are used to charge the corresponding content providers.

In a first scenario, a CPX campaign A is supported by a CPM campaign B (where 'X' refers to one of multiple types of actions, such as a user selection (CPC), a view (CPV), a lead generation (CPL), etc.). The amount to charge a content provider for the CPX campaign A is determined as follows: max(floor$_{A,CPX}$, eCPI$_B$/($\alpha$*p$_A$), or, in other words, by finding the maximum of (1) a floor price of the content item selection event and (2) a ratio of the eCPI of the CPM campaign B to a product of (i) a position-specific factor of the CPX campaign A and (ii) a predicted rate (p$_A$) (e.g., pCTR, pVTR, or pLTR) of the CPX campaign A. The predicted rate (p$_A$) refers to the current uncorrected predicted rate from a model assuming the top content item position.

In a second scenario, a CPM campaign A is supported by a CPX campaign B. The amount to charge a content provider for the CPM campaign A is determined as follows: max (floor$_{A,CPM}$/1000, $\alpha$*eCPI$_B$), or, in other words, by finding the maximum of (1) a floor price of the content item selection event divided by one thousand and (2) a product of (i) a position-specific factor of the CPX campaign B and (ii) the eCPI of the CPX campaign B. The eCPI$_B$ used here refers to the current uncorrected eCPI, which is the CPX bid*the predicted rate from the prediction model assuming the top content item position.

In a third scenario, an auto-bidding campaign A is supported by a CPC campaign B. The amount to charge a content provider for the auto-bidding campaign A is determined as follows: max(floor$_{A,CPX}$*p$_A$, $\alpha$*eCPI$_B$), or, in other words, by finding the maximum of (1) a floor price of the content item selection event multiplied by a predicted rate of campaign A and (2) a product of (i) a position-specific factor of the CPX campaign B and (ii) the eCPI of the CPX campaign B. Again, the eCPI$_B$ used here refers to the current uncorrected eCPI, which is the CPX bid*the predicted rate from the prediction model assuming the top content item position.

A Content Item Position-Aware Model

In an embodiment, instead of calculating and leveraging one or more position-specific factors in a content item selection event, a position-aware model is trained based on content item positions and takes, as input, a content item position (as opposed to a slot position). Thus, the position-aware model predicts a particular rate (e.g., user selection or view) for different content item positions.

In this embodiment, the position-aware model is used in the queue-based approach where different types of campaigns are assigned to different queues and each queue is sorted based on eCPI. If there are multiple non-CPM queues, then there may be a different position-aware model for each type of non-CPM campaign. For example, one position-aware model is trained and used for CPC campaigns while another position-aware model is trained and used for CPV campaigns.

Each eCPI of a non-CPM campaign is based on a prediction that is based on the first content item position. Then, after the first campaign is selected from the top ranked campaigns in each queue based on highest eCPI, the position-aware model is used to calculate a predicted rate for the top most ranked campaign of one of the queues. For example, if there are CPC and CPV campaigns and a first position-aware model for CPC campaigns and a second position-aware model for CPV campaigns, then the first position-aware model is used to calculate a predicted user selection rate for the top ranked CPC campaign and the second position-aware model is used to calculate a predicted view rate for the top ranked CPV campaign. An eCPI of the top ranked CPC campaign is calculated based on the predicted user selection rate and the bid of that campaign while an eCPI of the top ranked CPV campaign is calculated based on the predicted view rate and the bid of that campaign.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
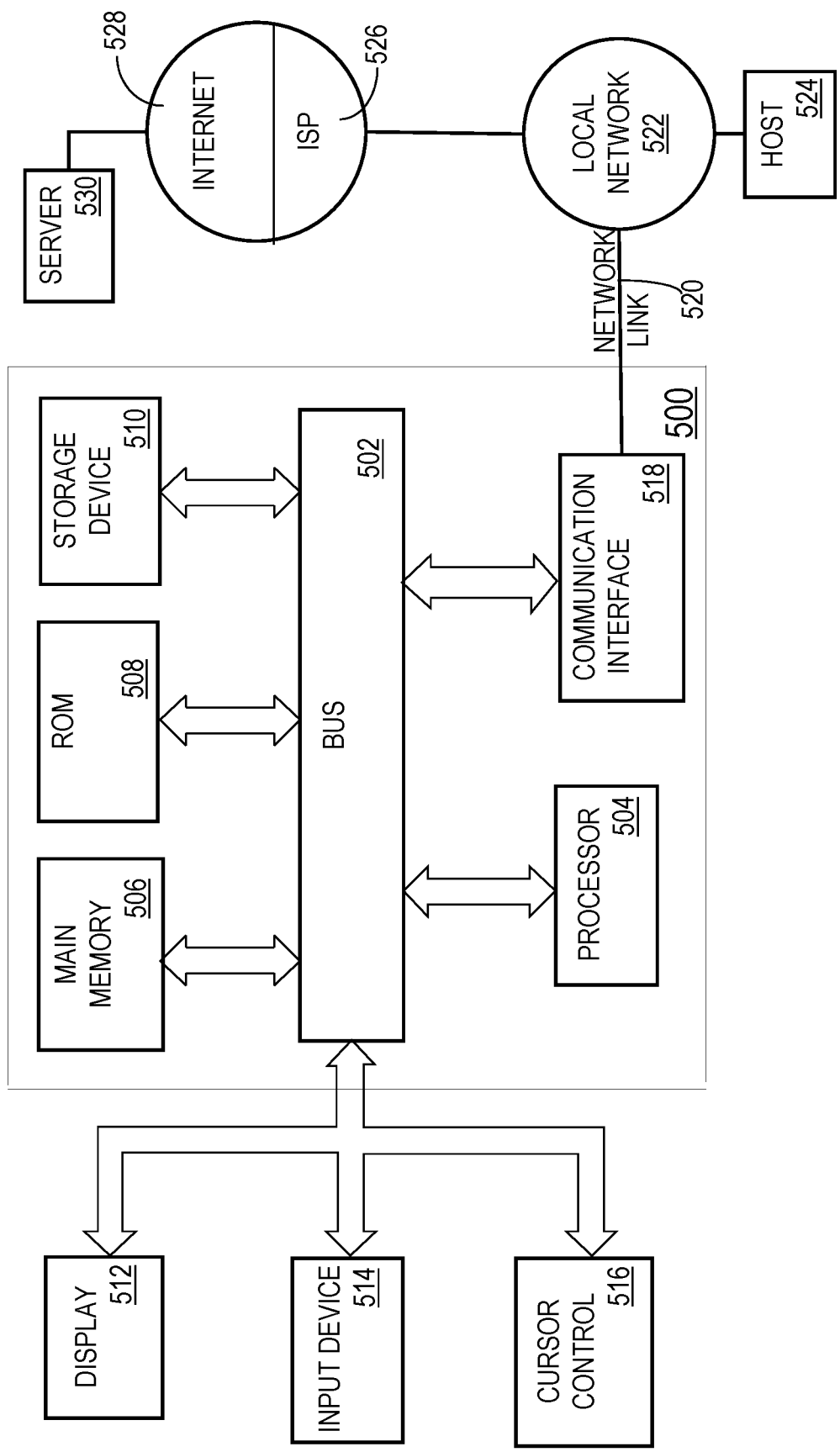
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining a position-specific factor based on a ratio of an observed interaction and a predicted interaction;
   identifying a plurality of content items for presentation on a screen of a computing device, wherein the plurality of content items includes:
      one or more content items for which a predicted interaction rate is calculated, and
      one or more content items for which no predicted interaction rate is calculated;
   determining an order of the plurality of content items based on the position-specific factor;
   causing the plurality of content items to be presented on the screen of the computing device based on the order;
   wherein the method is performed by one or more computing devices.

2. The method of claim 1, wherein the position-specific factor is a first position-specific factor and is associated with a first slot, the method further comprising:
   determining a plurality of position-specific factors that includes the first position-specific factor;
   wherein determining the plurality of position-specific factors comprises:
      for each slot of a plurality of slots other than the first slot, determining a particular position-specific factor based on a ratio of an observed interaction for said each slot and a predicted interaction for said each slot;
   wherein determining the order of the plurality of content items is based on the plurality of position-specific factors.

3. The method of claim 1, wherein the position-specific factor is a first position-specific factor and is for a first type of interaction:

determining a second position-specific factor that is for a second type of interaction that is different than the first type of interaction and is based on a second ratio of a second observed interaction and a second predicted interaction;

wherein determining the order of the plurality of content items is also based on the second position-specific factor.

4. The method of claim 1, further comprising:
identifying a first subset of the plurality of content items, wherein each content item in the first subset is associated with a first type;
identifying a second subset of the plurality of content items, wherein each content item in the second subset is associated with a second type that is different than the first type;
ordering the first subset separately from ordering the second subset;
computing a first value of a first content item in the first subset based on the position-specific factor;
comparing the first value with a second value of a second content item in the second subset, wherein the second value is not based on the position-specific factor;
based on a difference between the first value and the second value, removing the first content item from the first subset.

5. The method of claim 4, wherein the position-specific factor is a first position-specific factor, the method further comprising:
determining a second position-specific factor that is different than the first position-specific factor;
after removing the first content item from the first subset:
computing a third value of a third content item in the first subset based on the second position-specific factor;
comparing the third value with the second value;
based on a difference between the third value and the second value, removing the third content item from the first subset or removing the second content item from the second subset.

6. The method of claim 1, further comprising:
for a first slot, determining a value for each content item of a first plurality of content items and selecting a first content item, from the first plurality of content items, that is associated with the highest value;
removing the first content item from the first plurality of content items to create a second plurality of content items, wherein the second plurality of content items is a strict subset of the first plurality of content items;
for a second slot, determining a value for each content item of the second plurality of content items and selecting a second content item, from the second plurality of content items, that is associated with the highest value.

7. The method of claim 1, further comprising:
for a first slot, determining a first ratio between first observed interaction data and first predicted interaction data;
for a second slot, determining a second ratio between second observed interaction data and second predicted interaction data;
wherein the position-specific factor is based on a ratio of the second ratio and the first ratio.

8. The method of claim 1, further comprising:
identifying a first subset of the plurality of content items, wherein each content item in the first subset is associated with a first type;
identifying a second subset of the plurality of content items, wherein each content item in the second subset is associated with a second type that is different than the first type;
for each content item in the first subset of the plurality of content items, determining an effective cost per impression that is based on a resource reduction amount associated with said each content item and a predicted interaction rate associated with said each content item;
for each content item in the second subset of the plurality of content items, determining an effective cost per impression that is based on a resource reduction amount associated with said each content item.

9. The method of claim 1, wherein:
the position-specific factor is a first position-specific factor;
the observed interaction and the prediction interaction are relative to a first value of a particular dimension from among a group consisting of a time window, a channel, a device, and a geography;
the method further comprising determining a second position-specific factor based on a ratio of a second observed interaction and a second predicted interaction that are relative to a second value, of the particular dimension, that is different than the first value.

10. The method of claim 1, wherein the observed interaction and the predicted interaction are one of multiple types of interactions that includes user selection, user viewing, or user submitting a form.

11. One or more storage media storing instructions which, when executed by one or more processors, cause:
determining a position-specific factor based on a ratio of an observed interaction and a predicted interaction;
identifying a plurality of content items for presentation on a screen of a computing device, wherein the plurality of content items includes:
one or more content items for which a predicted interaction rate is calculated, and
one or more content items for which no predicted interaction rate is calculated;
determining an order of the plurality of content items based on the position-specific factor;
causing the plurality of content items to be presented on the screen of the computing device based on the order.

12. The one or more storage media of claim 11, wherein the position-specific factor is a first position-specific factor and is associated with a first slot, wherein the instructions, when executed by the one or more processors, further cause:
determining a plurality of position-specific factors that includes the first position-specific factor;
wherein determining the plurality of position-specific factors comprises:
for each slot of a plurality of slots other than the first slot, determining a particular position-specific factor based on a ratio of an observed interaction for said each slot and a predicted interaction for said each slot;
wherein determining the order of the plurality of content items is based on the plurality of position-specific factors.

13. The one or more storage media of claim 11, wherein the position-specific factor is a first position-specific factor and is for a first type of interaction:
determining a second position-specific factor that is for a second type of interaction that is different than the first type of interaction and is based on a second ratio of a second observed interaction and a second predicted interaction;

wherein determining the order of the plurality of content items is also based on the second position-specific factor.

14. The one or more storage media of claim 11, wherein the instructions, when executed by the one or more processors, further cause:

identifying a first subset of the plurality of content items, wherein each content item in the first subset is associated with a first type;

identifying a second subset of the plurality of content items, wherein each content item in the second subset is associated with a second type that is different than the first type;

ordering the first subset separately from ordering the second subset;

computing a first value of a first content item in the first subset based on the position-specific factor;

comparing the first value with a second value of a second content item in the second subset, wherein the second value is not based on the position-specific factor;

based on a difference between the first value and the second value, removing the first content item from the first subset.

15. The one or more storage media of claim 14, wherein the position-specific factor is a first position-specific factor, wherein the instructions, when executed by the one or more processors, further cause:

determining a second position-specific factor that is different than the first position-specific factor;

after removing the first content item from the first subset:
computing a third value of a third content item in the first subset based on the second position-specific factor;
comparing the third value with the second value;
based on a difference between the third value and the second value, removing the third content item from the first subset or removing the second content item from the second subset.

16. The one or more storage media of claim 11, wherein the instructions, when executed by the one or more processors, further cause:

for a first slot, determining a value for each content item of a first plurality of content items and selecting a first content item, from the first plurality of content items, that is associated with the highest value;

removing the first content item from the first plurality of content items to create a second plurality of content items, wherein the second plurality of content items is a strict subset of the first plurality of content items;

for a second slot, determining a value for each content item of the second plurality of content items and selecting a second content item, from the second plurality of content items, that is associated with the highest value.

17. The one or more storage media of claim 11, wherein the instructions, when executed by the one or more processors, further cause:

for a first slot, determining a first ratio between first observed interaction data and first predicted interaction data;

for a second slot, determining a second ratio between second observed interaction data and second predicted interaction data;

wherein the position-specific factor is based on a ratio of the second ratio and the first ratio.

18. The one or more storage media of claim 11, wherein the instructions, when executed by the one or more processors, further cause:

identifying a first subset of the plurality of content items, wherein each content item in the first subset is associated with a first type;

identifying a second subset of the plurality of content items, wherein each content item in the second subset is associated with a second type that is different than the first type;

for each content item in the first subset of the plurality of content items, determining an effective cost per impression that is based on a resource reduction amount associated with said each content item and a predicted interaction rate associated with said each content item;

for each content item in the second subset of the plurality of content items, determining an effective cost per impression that is based on a resource reduction amount associated with said each content item.

19. The one or more storage media of claim 11, wherein:

the position-specific factor is a first position-specific factor;

the observed interaction and the prediction interaction are relative to a first value of a particular dimension from among a group consisting of a time window, a channel, a device, and a geography;

the instructions, when executed by the one or more processors, further cause comprising determining a second position-specific factor based on a ratio of a second observed interaction and a second predicted interaction that are relative to a second value, of the particular dimension, that is different than the first value.

20. The one or more storage media of claim 11, wherein the observed interaction and the predicted interaction are one of multiple types of interactions that includes user selection, user viewing, or user submitting a form.

* * * * *